July 6, 1926.  1,591,140
P. B. PARKS
CONTROL APPARATUS FOR HEATING SYSTEMS
Filed Feb. 19, 1925   3 Sheets-Sheet 1

Inventor
Paul B. Parks
By Barnett Truman
Attorneys

July 6, 1926.
P. B. PARKS
1,591,140
CONTROL APPARATUS FOR HEATING SYSTEMS
Filed Feb. 19, 1925  3 Sheets-Sheet 2
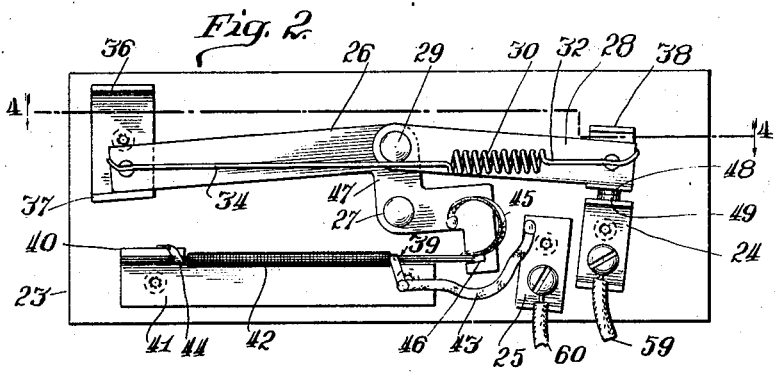
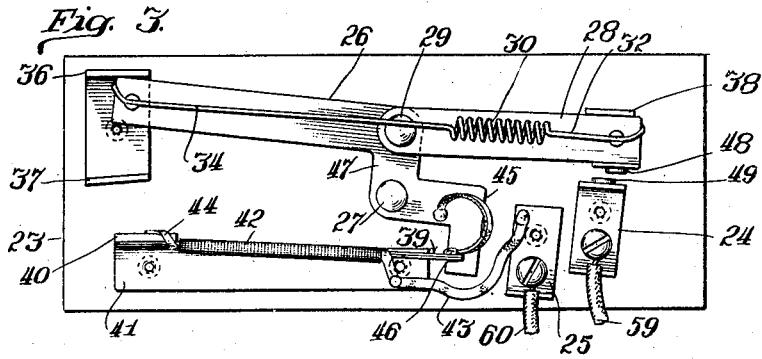
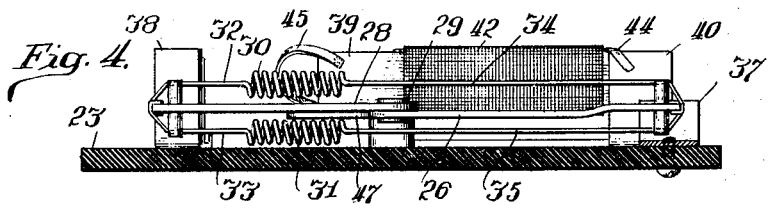
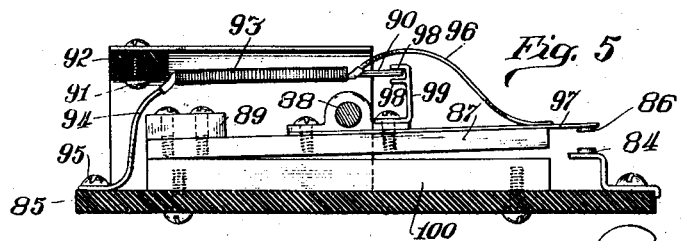
Inventor
Paul B Parks
By Barnett & Truman
Attorneys July 6, 1926.
P. B. PARKS
1,591,140
CONTROL APPARATUS FOR HEATING SYSTEMS
Filed Feb. 19, 1925      3 Sheets-Sheet 3
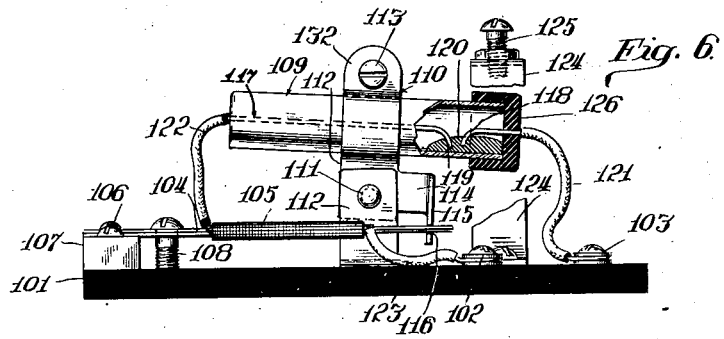

Patented July 6, 1926.

1,591,140

UNITED STATES PATENT OFFICE.

PAUL B. PARKS, OF OAK PARK, ILLINOIS, ASSIGNOR TO VAPOR CAR HEATING COMPANY, INC., OF CHICAGO, ILLINOIS, A CORPORATION OF NEW YORK.

CONTROL APPARATUS FOR HEATING SYSTEMS.

Application filed February 19, 1925. Serial No. 10,292.

My invention relates to an automatically controlled heating system adapted particularly for the heating of railway cars of the general character of that shown and described in United States Patent No. 1,440,701, to E. A. Russell, January 2, 1923, and in the pending application of Paul B. Parks and John Van Vulpen for heating system, filed May 19, 1924, Serial No. 640,133, which latter seeks to cover certain improvements upon the apparatus of the Russell patent referred to. In apparatus of the character indicated, the radiator valve is opened and closed by alternately energized solenoids controlled in response to the action of thermostatic mechanism located in the car, and a limit switch is provided operated by the rotational movements of the radiator valve for cutting off the current from the solenoids as soon as the valve movements are completed. The purpose of the limit switch is to save current and, more particularly, to prevent the solenoid coils from being burned out by the continued flow of current therethrough.

Some trouble, however, has been experienced in the functioning of the limit switch due to its proximity to the valve and its liability to injury through leakage of steam from the valve; and with a view to improving the durability and reliability of the apparatus I have devised a system of remote control for the valve motor (the solenoid coils referred to) which eliminates the limit switch, the switch being replaced by circuit breakers in the circuits of the solenoid coils. Inasmuch as the valve may be moved by hand, in the case of remote control, either through ignorance or maliciously, with the possibility of disabling the intended automatic control effected through fluctuations in car temperature, the circuit breakers of my present invention are devised so as to effect a return of the valve and solenoid core to their proper positions within a short time after any movement of the same by hand away from said positions.

The principal object of my invention is to provide a valve controlling mechanism which will function in this way. Further incidental objects will be referred to in the following description of the preferred embodiments of the invention illustrated in the accompanying drawings.

In the drawings:—

Fig. 2 is a plan view of one of the circuit breakers showing the same in circuit closing position.

Fig. 3 is a similar view of the device with the contacts separated.

Fig. 4 is a sectional view on line 4—4 of Fig. 2, looking in the direction of the arrows.

Fig. 5 is a sectional view of a modified form of circuit breaker.

Fig. 6 is a side elevation of another modification.

Fig. 7 is a plan view of the circuit breaker shown in Fig. 6.

Fig. 8 is an end view, looking from the right at Figs 6 and 7.

Fig. 9 is a perspective view of a portion of the adjustable clamp for pivotally supporting the mercury tube.

Figure 1:
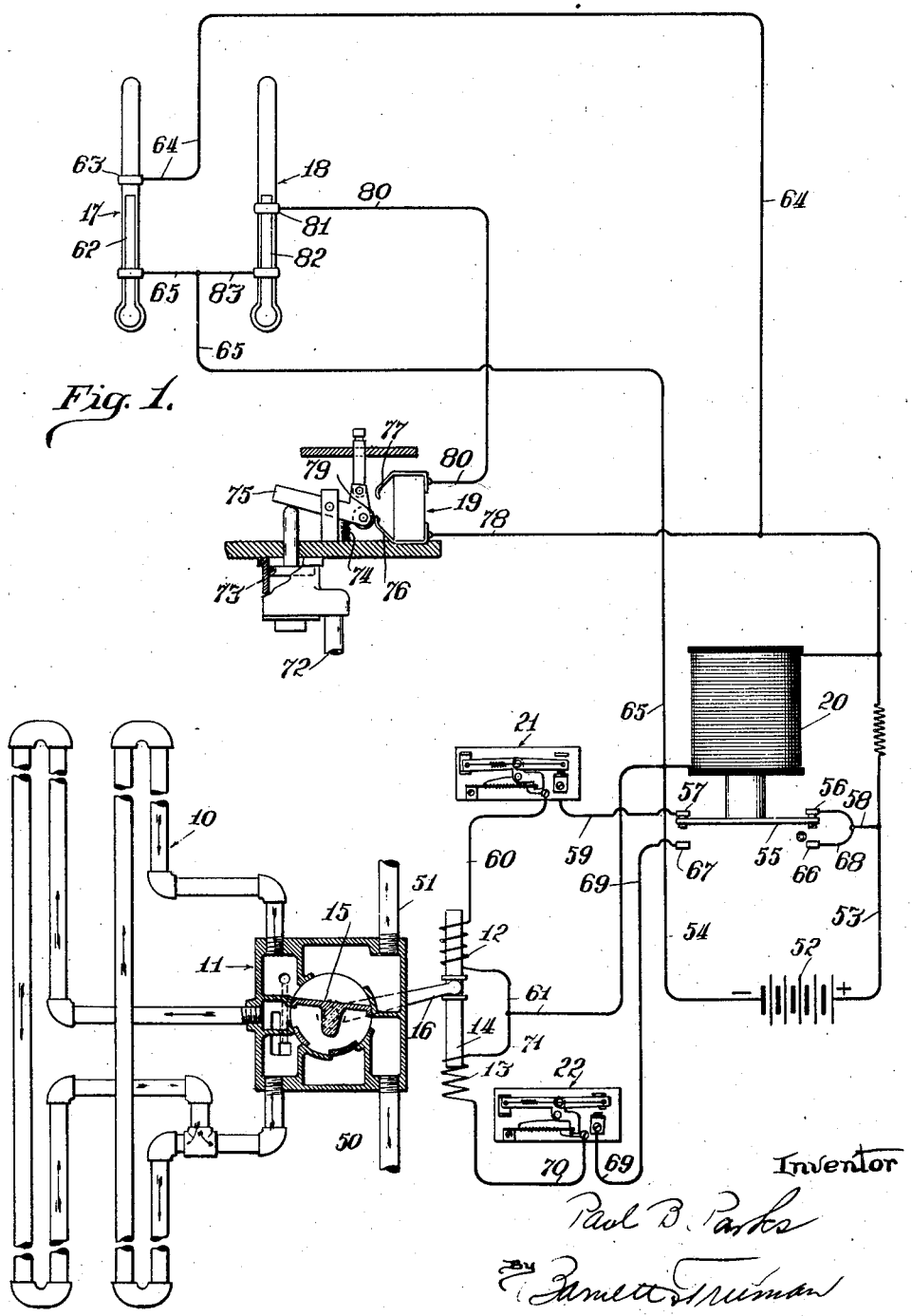
Fig. 1 is a diagrammatic view of a car heating system provided with the improved control arrangements of my present invention.

Referring to the drawings 10 designates a radiator, 11 a valve for controlling the circulation of heating medium through the radiator, and 12 and 13 the coils of a pair of solenoids having a common core 14 adapted to give rotational movements to the valve body 15, which latter is connected with the core by an operating lever 16. 17 designates a high temperature thermostat and 18 a low temperature thermostat. These thermostats are put into control of the heating system selectively by means of a switching device 19 which is operated through the appearance and disappearance of air pressure in one of the air train lines of the car. 20 is a relay, the flow of current through which is controlled by either the high temperature thermostat or the low temperature thermostat, as the case may be, for switching current to and from the solenoid coils 12 and 13 in alternation. So far as thus described, the apparatus is substantially the same as that disclosed in the Russell patent above referred to. However, the limit switch of the patented apparatus is omitted and in place thereof circuit breakers 21, 22 preferably of identical construction, are arranged in the circuits of the solenoid coils.

Figs. 2, 3 and 4 illustrate a preferred construction of the circuit breaker. 23 is a base of insulating material provided with a fixed contact 24 and with a plate 25. 26 is a rocking member of angular configuration pivoted to the base plate at 27. A contact arm 28 is pivoted at 29 to the rocking member 26. The contact arm is adapted to be drawn against the fixed contact 24 by means of a pair of coiled springs 30, 31 having straight extensions 32, 33 engaging the outer end of the contact arm 28 and straight extensions 34, 35 engaging the remote end of rocking member 26. The remote end of the rocking member moves between spaced studs 36, 37. A stop 38 is also provided for the contact arm 28. A bimetallic bar 39 is secured at one end to an upstanding lug 40 on a plate 41 mounted on base 23 and this heat sensitive element is surrounded by a resistance element 42 having an electric connection 43 at one end leading to plate 25 and a connection 44 at the other end with the bimetallic bar 39. The free end of the latter is connected by flexible wire 45 with the rocking member 26. The free end of the bimetallic bar engages a notch 46 in the end of the rocking member. The bar 39 is constructed so that when heated by passage of current through the resistance element 42 it is warped in a direction to rock member 26 against the action of springs 30, 31 and bring about a separation of contact arm 28 from the fixed contact 24. Because of the elbow bend 47 in the rocking member contact stud 48 on arm 28 has a wiping movement over contact stud 49 on the fixed contact plate 24 when the circuit is made or broken. This tends to keep the contacts clean.

The operation of the apparatus as above described is as follows: The parts of the apparatus as shown in Fig. 1 indicate operation of the heating system under control of high temperature thermostat 17 with the temperature of the car below that which this thermostat is intended to maintain. Hence the radiator 10 is receiving steam from supply pipe 50, water of condensation being evacuated from the radiator through pipe 51. Current is flowing through the relay 20 over the following circuit: battery 52, wire 53, relay 20, and wire 54 to the battery. Relay 20 being energized, its armature is raised bringing the bridging member 55 against the upper contacts 56, 57. This closes a circuit through the circuit breaker 21 and solenoid coil 12 as follows: wire 53, wire 58, contact 56, bridging member 55, contact 57, wire 59, circuit breaker 21, wire 60, coil 12, wire 61 to wire 54, and thence to the battery. This circuit, however, is closed only when contact arm 28 is in the position shown in Fig. 2. Assuming that the valve has just been moved to its position as shown in Fig. 1, the continued flow of current through the resistance element 42 of the circuit breaker will cause the bimetallic bar 39 to warp in the direction to rock member 26 and bring about a separation as between the contacts of the circuit breaker, moving the parts to the positions shown in Fig. 3. The heat sensitive element 39 is constructed preferably so that it will be warped in something less than a minute. This gives plenty of time for the valve movement but prevents any undue heating of the solenoid coil. With the circuit broken at this point the bimetallic bar will eventually cool and warp back to its original position, bringing about, necessarily, a re-closing of the circuit last traced. Preferably the construction of the bar is such that this cooling requires a considerably longer period of time than the heating of the bar. The circuit through the solenoid coil 12 is closed at intervals for brief periods so that if the valve body 15 of valve 11 is moved by hand, or otherwise, without corresponding movement of the bridging member 55 of the relay 20, it will be soon after returned to its proper position through energization of solenoid 12.

The relay 20 is deenergized so as to switch the current to solenoid 13 when the mercury column 62 of the high temperature thermostat 17 reaches the contact 63. This closes a circuit through the high temperature thermostat as follows: battery 52, wire 53, wire 64, contact 63, mercury column 62, wire 65, wire 54 to battery. The circuit through the relay coil is in parallel with the high temperature thermostat circuit, just traced, and as the resistance of the relay circuit is much higher than the resistance of the thermostat circuit the relay coil will be deprived of most of its current so as to drop the bridging member 55 on the lower pair of contacts 66, 67. Current now flows through the circuit of solenoid 13 as follows: battery 52, wires 53, 58, 68, contacts 66, bridging member 55, contact 67, wire 69, thermal circuit breaker 22, wire 70, solenoid 13 and wires 71, 61 and 54, to the battery. With the circuit breaker 22 closed (and the device will be closed intermittently at definite intervals of no great length), solenoid 13 will be energized so as to move the valve body 15 of valve 11 to a position in which steam is short circuited from supply pipe 50 to return pipe 51 without passing through the radiator, the ends of which are placed in communication with the drain port of the valve 11.

It will be understood that circuit breaker 22 operates, in the same way as circuit breaker 21, to return the valve to its closed position if it has been moved from that position without a corresponding shifting of the bridging member 25.

When the low temperature thermostat is in control of the system the operations are the same as those described in connection with the control by the high temperature thermostat 17 except that the radiator valve 11 is closed at a lower temperature. That is, the high temperature thermostat 17 may be set to maintain a temperature in the car of 70° Fahrenheit, while the low temperature thermostat, employed when the car is standing in the yard, for example, may be designed to maintain a temperature of 50° Fahrenheit. When the car is cut off from the train the air pressure in the pipe 72, which is connected with one of the air train lines of the car, is dissipated and the plunger 73 of the selector switch 19 is returned to its lower position under action of spring 74. The pivoted switch arm 75 is moved to bridge the gap between contacts 76 and 77, closing at the selector switch, a circuit through the low temperature thermostat as follows: battery 52, wires 53, 64, 78, contact 76, roller 79 on selector switch arm 75, contact 77, wire 80, contact 81 of the low temperature thermostat 18, mercury column 82 (assuming that the mercury column has reached contact 81) wires 83, 65 and 54 to the battery. The low temperature thermostat circuit is now in parallel with the relay circuit so that the relay is energized or deenergized, dependent upon whether the low temperature thermostat circuit is open or closed at the thermostat.

Fig. 5 shows a modified construction of the vibrating thermal cut-out. 84 is a fixed contact on the base plate 85 and 86 a movable contact carried on an arm 87 pivoted at about its middle on a stationary stud 88, the arm 87 preferably carrying a counterweight 89 at the end opposite from contact 86. The bimetallic bar 90 is fixed at one end by a screw 91 to the bracket 92 and provided with the resistance element 93 electrically connected by wire 94 to the binding post 95 and by wire 96 to the contact plate 97 on arm 87. The free end of the bimetallic bar extends between lugs 98 on a bracket 99 secured to the arm 87. The rocking member 87 is the armature of a magnet 100 for the purpose of closing and opening the contacts with a snap action. The bimetallic bar 90 is formed so that it warps upwardly, that is, in the direction to separate the contacts, when heated. In cooling the bar warps in the opposite direction so as to bring the contacts together.

Referring now to the modification shown in Figs. 6 to 9 inclusive, 101 is the insulating base on which is mounted the binding posts 102 and 103, to which are connected the leads 59 and 60, or 69 and 70, as shown in Fig. 1. The bimetallic bar 104 surrounded by the resistance coil or heating element 105, is mounted at one end 106 on a lug 107 projecting upwardly from the insulating base 101. An adjusting screw 108 projects through the bar 104 near its fixed end 106, and is screwed into base 101 at its lower end. The amount of upward warping movement of the bimetallic bar 104 when heated, as hereinafter described, is limited by suitably adjusting the screw 108.

A hollow tube 109, closed at both ends, is mounted at approximately its central portion in a supporting bracket 110, pivoted at 111 in a yoke 112, extending upwardly from the base 101, as best shown in Fig. 8. Bracket 110 comprises two similar semi-cylindrical members, each having radially extending flanges 132, which are clamped together to secure the two halves of the bracket about the tube 109. By loosening the screw 113, the tube 109 may be adjusted longitudinally in bracket 110. One of the members forming the bracket 110 (as best shown in Fig. 9), is provided at its lower end with a lateral extension 114, terminating in a right angled extension 115 having a slot 116 in which is engaged the free end of bimetallic bar 104.

A pair of electrical contact wires 117 and 118 are mounted in the two ends of tube 109 and project centrally into the tube. Wire 117 is much longer than wire 118, and the inner ends of these wires are bent downwardly, as indicated at 119, and spaced slightly apart, near one end of tube 109. A globule of mercury 120 is carried within the tube 109 and adapted to run from one end of the tube to the other, as the tube is inclined about the axis 111. When this globule of mercury is at the right hand end of the tube, as shown in Fig. 6, the downturned ends of wires 117 and 118 will be connected by this body of mercury. When the tube is tipped the other way, so that the globule will run to the left hand end of the tube, the ends 119 of these wires will be out of contact with one another, and there will be no electrical connection therebetween. Wire 118 is connected with binding post 103 by means of lead wire 121, and wire 117 is similarly connected with one end of the heating element 105, by means of lead 122. The other end of heating element 105 is connected by lead 123 with the other binding post 102.

A bracket 124, projecting upwardly from base 101, carries an adjusting screw 125 for limiting the tilting movement of tube 109 in the direction which breaks the circuit. A rubber-cap 126 surrounds this end of tube 109, to contact with screw 125 and serves both as a shock-absorbing and insulating medium.

The operation of this form of the apparatus is much the same as in the modifications previously described. When current flows through the device the resistance element 105 will cause the heat sensitive bar 104 to warp upwardly, and since the free end of this bar is in engagement with the slotted lower end of pivoted bracket 110, the tube 109 will be tilted, toward the left, (Fig. 6) so that the mercury globule 120 will run to the left hand end of the tube, thereby breaking the contact between ends 119 of wires 117 and 118. After the circuit is broken, the heat sensitive bar 104 will gradually cool off, and gradually return to its normal position, as shown in Fig. 6, whereupon the globule 120 will run back to the right hand end of the tube and again complete the circuit through this device. Although the tilting movement of tube 109 in either direction will take place quite slowly, the mercury globule 120 will run suddenly and rapidly from one end of the tube to the other when the critical angle has been reached, thereby giving the desired snap action to the circuit breaker. The sensitiveness of bimetallic bar 104 may be adjusted by suitably turning the screw 108, and the balance of the mercury-tube 109 may be adjusted by moving the tube longitudinaly through the bracket 110.

The specific forms of circuit breakers hereinabove disclosed are not claimed in this application, except as a component part of the automatically controlled heating system, but are claimed in a divisional application, Serial Number 52,112, filed August 21, 1925.

I claim:—

1. In a heating system, the combination of a radiator, a valve to control the circulation through the radiator, a motor comprising a pair of alternately energized electromagnets for giving movements in opposite directions to the valve, and means in each magnet circuit automatically actuated by the flow of current through the circuit for intermittently making and breaking the circuit.

2. In a heating system, the combination of a radiator, a valve to control circulation through the radiator, an electric motor to operate the valve, automatically operating means for making and breaking the circuit through the motor in response to temperature changes, and a circuit breaker in the motor circuit, actuated thermostatically by the flow of current therethrough for intermittently opening and closing the circuit through the motor.

3. In a heating system, the combination of a radiator, a valve to control circulation through the radiator, a motor comprising a pair of alternately energized electric magnets for giving movements in opposite directions to the valve, and a means in each magnet circuit which is thermally actuated intermittently for opening and closing the circuit.

4. In a heating system, the combination of a radiator, a valve to control circulation through the radiator, an electric motor to operate the valve, and a circuit breaker comprising a heat sensitive element heated by flow of current through the motor circuit for intermittently opening and closing said circuit.

5. In a heating system, the combination of a radiator, a valve to control the circulation through the radiator, a motor comprising a pair of alternately energized electro-magnets for giving movements in opposite directions to the valve, and a circuit breaker in the circuit of each of said magnets adapted to intermittently open and close said circuit.

6. In a heating system, the combination of a radiator, a valve to control the circulation through the radiator, a motor comprising a pair of alternately energized electromagnets for giving movements in opposite directions to the valve, and a circuit breaker in the circuit of each magnet comprising a heat sensitive element heated by flow of current through said circuit for intermittently opening and closing said circuit.

7. In a heating system, the combination of a radiator, a valve for the same, a pair of solenoid coil and core for moving the valve in opposite direction, and a circuit breaker in each solenoid circuit comprising a heat sensitive element adapted when heated and cooled to open and close said circuit.

8. In a heating system, the combination of a radiator, a valve to control circulation through the radiator, an electric motor to operate the valve, and a circuit breaker in the motor circuit comprising a bimetallic element warped in opposite directions to open and close said circuit and a resistance element in the motor circuit to heat said bimetallic element.

9. In a heating system, the combination of a radiator, a valve to control circulation through the radiator, an electric motor to operate the valve, and a circuit breaker in the motor circuit comprising a movable contact arm, a bimetallic element warped by heat to move the arm to circuit opening position, a resistance element in the motor circuit for heating said bimetallic element, and a spring which tends to hold the arm in circuit closing position.

10. In a heating system, the combination of a radiator, a valve to control circulation through the radiator, an electric motor to operate the valve, and a circuit breaker in the motor circuit comprising a bimetallic bar adapted to be warped by heat, a resistance element in the motor circuit for heating said bar, a rocking member engaged by the bar, a fixed contact, and a contact arm pivoted to the rocking member having a contact which is moved against and from the fixed contact with wiping movements.

11. In a heating system, the combination of a radiator, a valve to control the circulation through the radiator, an electric motor to operate the valve, and a circuit breaker in the motor circuit comprising a by-metallic bar adapted to be warped by heat, a resistance element in the motor circuit for heating said bar, an intermediately pivoted rocking element engaged at one end by the bar, a contact arm pivoted at one end to a movable portion of the rocking element, a spring connecting the free ends of the rocking element and the contact arm and extending over the pivot of the contact arm so that contraction of the spring will snap the contact arm to either side of its pivot, a contact carried by the free end of the contact arm, a fixed contact with which the movable contact engages when the contact arm swing to one side of its pivot, and a stop for limiting swinging movement of the contact arm to the other side of its pivot.

12. In a car heating system, the combination of a radiator, a valve to the radiator which is movable by hand automatic mechanism for moving said valve, and means operative repeatedly at intervals for actuating said automatic mechanism, in case the valve has been moved by hand, to give the valve a movement in the direction opposite to the movement given the valve by hand.

13. In a heating system, the combination of a radiator, a valve to control circulation through the radiator, an electric motor to operate the valve, and means actuated by the flow of current through the motor circuit for intermittently breaking said circuit.

14. In combination with a valve, a pair of solenoid coils and core for moving the valve alternately in opposite directions, and means actuated by the flow of current through the solenoid circuits for intermittently breaking said circuits.

15. In combination with a valve, mechanism for moving the valve alternately in opposite directions comprising a pair of electro-magnets, a switching means for sending current alternately through said magnetic, and a vibrating circuit beraker in each of the magnet circuits adapted to be actuated intermittently by the current passing through said circuit.

16. In a heating system, the combination of a radiator, a valve, an electro-magnet for operating said valve, a circuit breaker in the circuit of the electro-magnet actuated by flow of current through said circuit for closing the circuit for relatively short periods and opening the same for longer periods.

PAUL BROWNLEE PARKS.